US008757051B2

(12) United States Patent
Medved et al.

(10) Patent No.: US 8,757,051 B2
(45) Date of Patent: Jun. 24, 2014

(54) SANDWICH MAKER

(75) Inventors: Gary E. Medved, Lyndhurst, OH (US);
David A. Medved, Mayfield Hts., OH (US)

(73) Assignee: Ursa Major, Inc., Lyndhurst, OH (US)

( * ) Notice: Subject to any disclaimer, the term of this patent is extended or adjusted under 35 U.S.C. 154(b) by 927 days.

(21) Appl. No.: 12/813,105

(22) Filed: Jun. 10, 2010

(65) Prior Publication Data

US 2011/0303097 A1 Dec. 15, 2011

(51) Int. Cl.
*A47J 37/06* (2006.01)

(52) U.S. Cl.
USPC ........... 99/349; 99/331; 99/353; 99/372; 99/375; 99/378

(58) Field of Classification Search
USPC ........... 99/331, 349, 353, 372, 375, 378, 379, 99/400, 425, 445, 446
See application file for complete search history.

(56) References Cited

U.S. PATENT DOCUMENTS

| | | | | |
|---|---|---|---|---|
| 1,738,972 A | * | 12/1929 | Strader | 99/379 |
| 2,587,314 A | * | 2/1952 | Hall | 99/342 |
| 3,121,385 A | * | 2/1964 | Blackburn et al. | 99/374 |
| 3,963,898 A | * | 6/1976 | Tuckwell | 219/524 |
| 3,996,847 A | | 12/1976 | Reed | |
| 4,173,179 A | * | 11/1979 | Arthur | 99/374 |
| 5,129,313 A | | 7/1992 | Coppier | |
| 5,713,264 A | | 2/1998 | Pomara, Jr. | |
| 6,026,737 A | * | 2/2000 | D'Alterio et al. | 99/349 |
| 6,332,768 B1 | * | 12/2001 | Raio et al. | 425/152 |
| 6,363,835 B1 | * | 4/2002 | Wu | 99/331 |
| 2009/0145304 A1 | | 6/2009 | Yu | |

FOREIGN PATENT DOCUMENTS

EP 94637 A1 * 11/1983 ............ A47J 37/06

OTHER PUBLICATIONS

Online Product literature for Anvil Panini Grills: http://www.paninigrills.com/anvil.html.
Online historical information on Electric Sandwich Grill or Mountain Pie Iron: http://www.toastercentral.com/appliance1.htm.

* cited by examiner

*Primary Examiner* — Dana Ross
*Assistant Examiner* — Ket D Dang
(74) *Attorney, Agent, or Firm* — Tarolli, Sundheim, Covell & Tummino LLP

(57) ABSTRACT

A food preparation device for crimping and sealing pieces of bread includes a base, at least one first heating unit positioned on the base, and at least one second heating unit spaced from the base and extending substantially parallel to the first heating unit. The second heating unit is movable from a first position spaced a first distance from the first heating unit to a second position spaced a second, shorter distance from the first heating unit for crimping and sealing bread pieces together between the first and second heating units. The first and second heating units remain parallel with one another while the second heating unit moves from the first position to the second position.

15 Claims, 6 Drawing Sheets

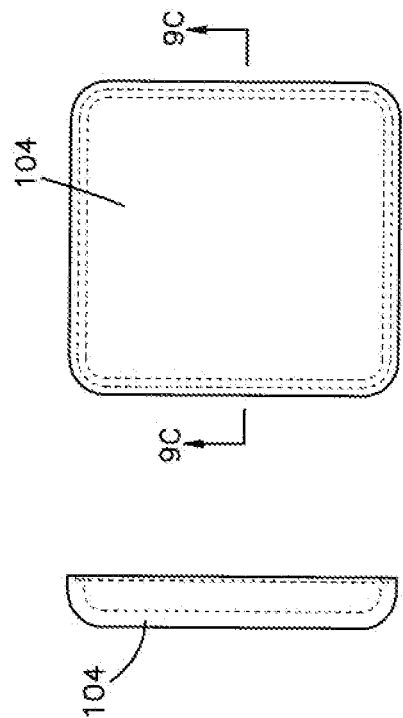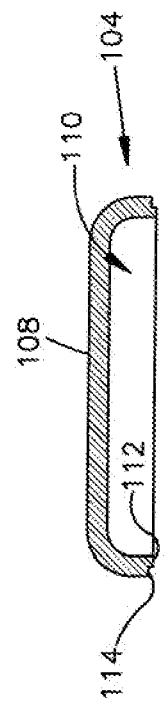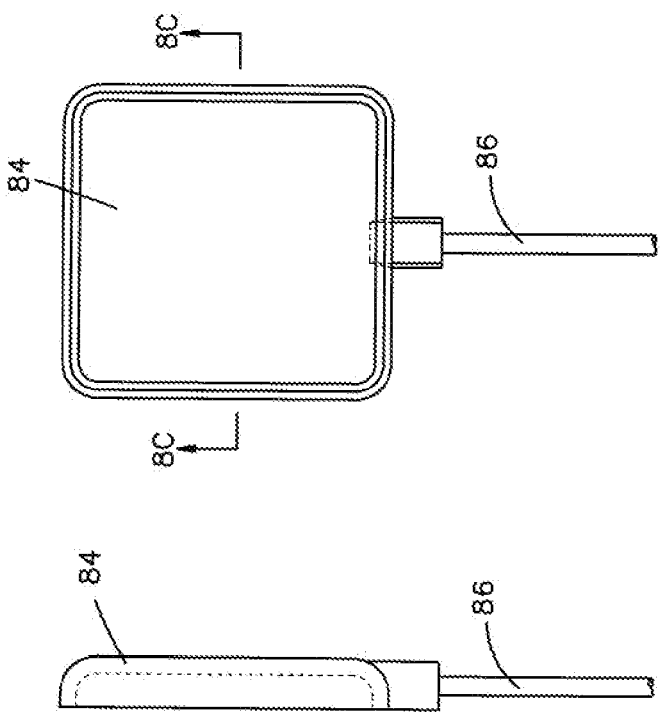

ated member spaced from the base and extending substantially parallel to the first heating unit. The second heating unit is movable from a first position spaced a first distance from the first heating unit to a second position spaced a second, shorter distance from the first heating unit for crimping bread pieces together between the first and second heating units. The first and second heating units remain parallel with one another while the second heating unit moves from the first position to the second position.

SANDWICH MAKER

TECHNICAL FIELD

The invention relates to a food preparation device and, in particular, relates to a sandwich maker for making sealed sandwiches.

BACKGROUND

Sealed sandwich makers are known in the art. The sandwich is typically made by filling the space between two pieces of bread with various ingredients, e.g., pie filling, pizza ingredients. The edges of the bread are then crimped or sealed together under force such that the inner ingredients do not leak out. In conventional sandwich makers the bread is crimped between two metal plates that cooperate with one another via a hinge. Due to this application of force, however, the metal plates also apply a lateral force to the bread pieces, which causes the bread pieces to move relative to one another. When the bread pieces are out of alignment, the peripheries of the bread pieces are unevenly crimped, creating an inadequate seal between the pieces and thereby leading to ingredient leakage. Therefore, there is a need in the art for a sandwich maker that ensures the bread pieces are aligned during crimping to ensure that the sandwich does not leak.

SUMMARY OF THE INVENTION

In accordance with the present invention a food preparation device for crimping and sealing pieces of bread together includes a base, at least one first heating unit positioned on the base, and at least one second heating unit spaced from the base and extending substantially parallel to the first heating unit. The second heating unit is movable from a first position spaced a first distance from the first heating unit to a second position spaced a second, shorter distance from the first heating unit for crimping bread pieces together between the first and second heating units. The first and second heating units remain parallel with one another while the second heating unit moves from the first position to the second position.

In accordance with another aspect of the present invention a food preparation device for crimping and sealing pieces of bread together includes a base, at least one first cooperating member positioned on the base, at least one second cooperating member spaced from the base and extending substantially parallel to the first cooperating member. The second cooperating member is movable from a first position spaced a first distance from the first cooperating member to a second position spaced a second, shorter distance from the first cooperating member for crimping and sealing bread pieces together between the first and second cooperating members. The first and second cooperating members remain parallel with one another while the second cooperating member moves from the first position to the second position.

In accordance with another aspect of the present invention a method for crimping and sealing pieces of bread together comprising the steps of providing a first heating unit on a base and providing a second heating unit connected to the base and extending substantially parallel with the first heating unit. The second heating unit is moved from a first position spaced a first distance from the first heating unit to a second position spaced a second, shorter distance from the first heating unit to crimp and seal bread pieces together between the first and second heating units. The first and second heating units remain parallel with one another while the second heating unit moves from the first position to the second position.

Other objects and advantages and a fuller understanding of the invention will be had from the following detailed description of the preferred embodiments and the accompanying drawings.

BRIEF DESCRIPTION OF THE DRAWINGS

FIG. 8A is a side view of a heated member of a first heating unit of the sandwich maker of FIG. 1;

FIG. 8B is a bottom view of the heated member of FIG. 8A;

FIG. 8C is a section view taken along line 8C-8C of FIG. 8B;

FIG. 9A is a side view of a heated member of a second heating unit of the sandwich maker of FIG. 1;

FIG. 9B is a bottom view of the heated member of FIG. 9A;

FIG. 9C is a section view taken along line 9C-9C of FIG. 9B;

DETAILED DESCRIPTION

Figure 1:
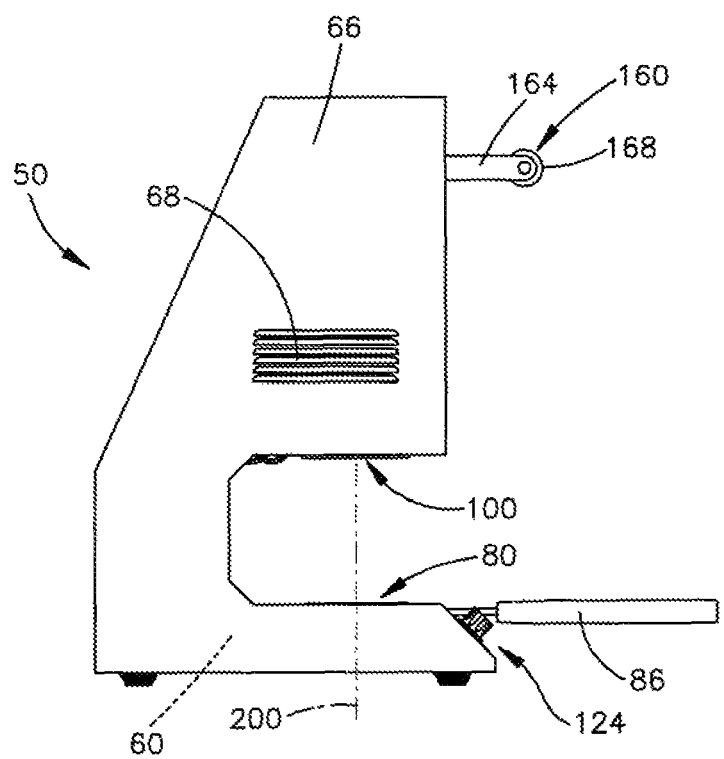
FIG. 1 is a side view of a sandwich maker in a first condition in accordance with the present invention.
Figure 2:
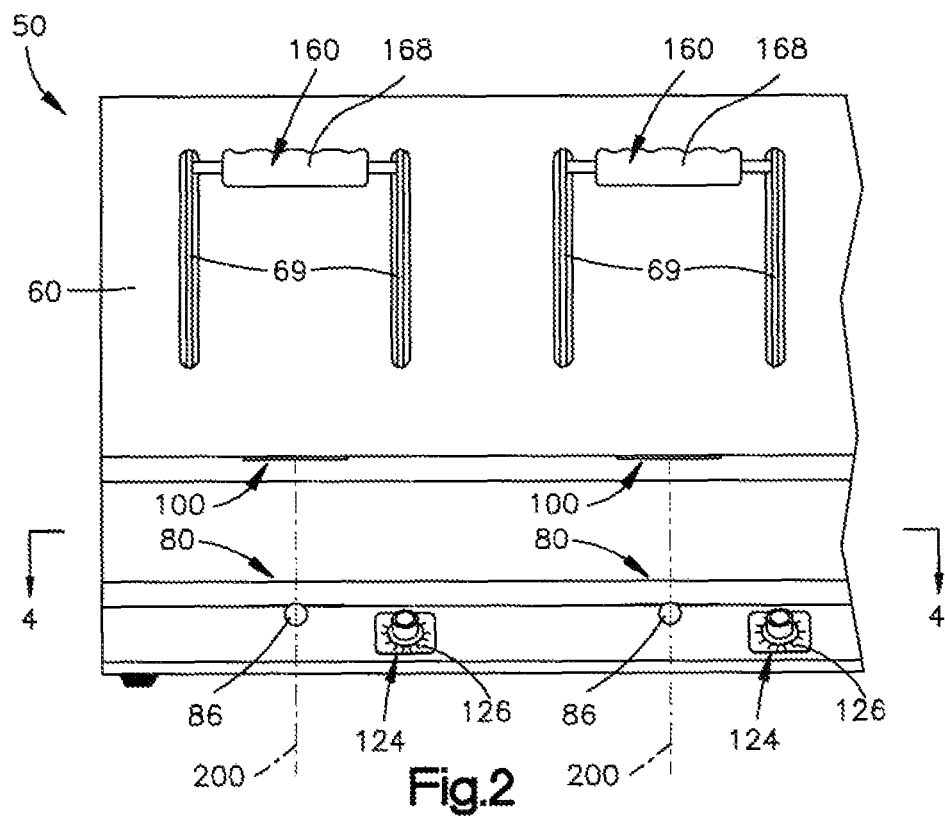
FIG. 2 is a front view of the sandwich maker of FIG. 1.

The present invention relates to a food preparation device and, in particular, relates to a sandwich maker for making sealed sandwiches. FIGS. 1-9 illustrate a food preparation device 50 in accordance with the present invention. As shown in FIGS. 1-4, the food preparation device 50 includes a base 60, a frame 70 connected to the base, at least one first heating unit 80 releasably mounted to the base, and at least one second heating unit 100 connected to the frame. Although FIGS. 1-4 illustrate that the food preparation device 50 includes a pair of first heating units 80 and a pair of corresponding second heating units 100 secured to the base 60, those having ordinary skill in the art will appreciate that the food preparation device may include more or fewer corresponding first and second heating units in accordance with the present invention. For simplicity, the foregoing describes the construction of the features used to position and operate one pair of first and second heating units 80, 100. Those having ordinary skill in the art, however, will appreciate that these features may be duplicated as necessary in order to position and operate any number of subsequent pairs of first and second heating units 80, 100 in accordance with the present invention.

The base 60 is constructed of a durable material, such as metal, and has a generally square or rectangular shape. The base 60 includes a recess 62 for receiving each of the first heating units 80. A plurality of feet 63 are secured to the bottom of the base 60 in order to stabilize the device 50 on a countertop, table, etc. The frame 70 is positioned above the base 60 and is secured to the base by a plurality of support members 64 extending from the base. The frame 70 extends substantially parallel to the base 60 and along a portion or all of the length of the base. The frame 70 may have any shape, such as circular, square, rectangular, triangular, etc.

Figure 5:
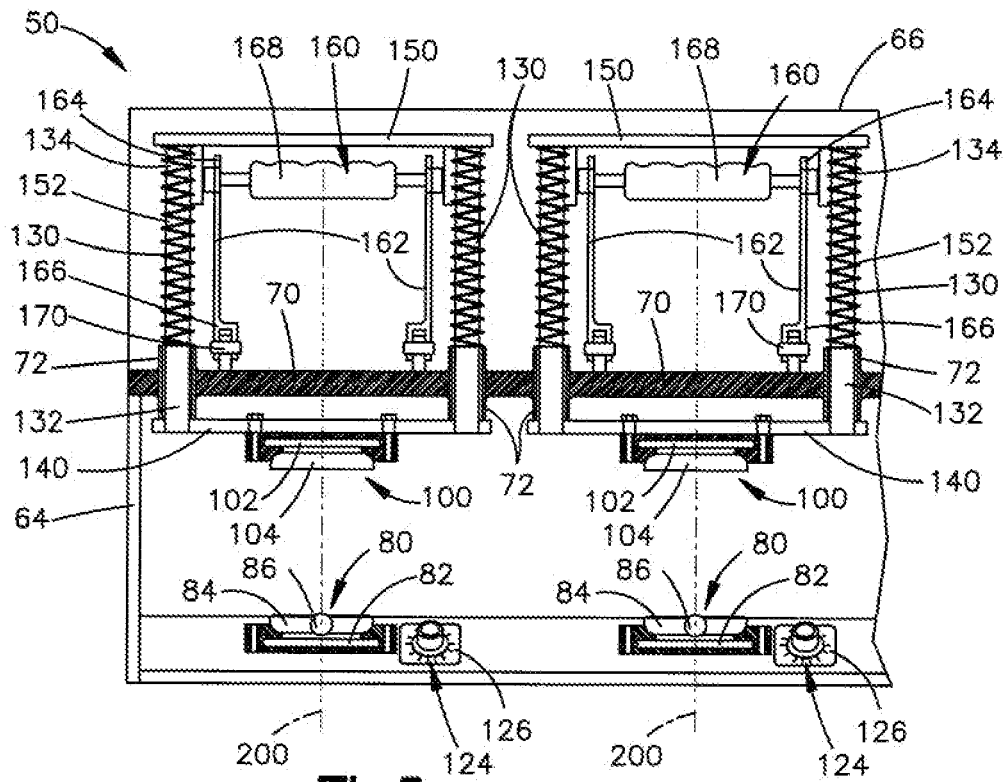
FIG. 5 is a sectional view taken along line 5-5 of FIG. 3.
Figure 6:
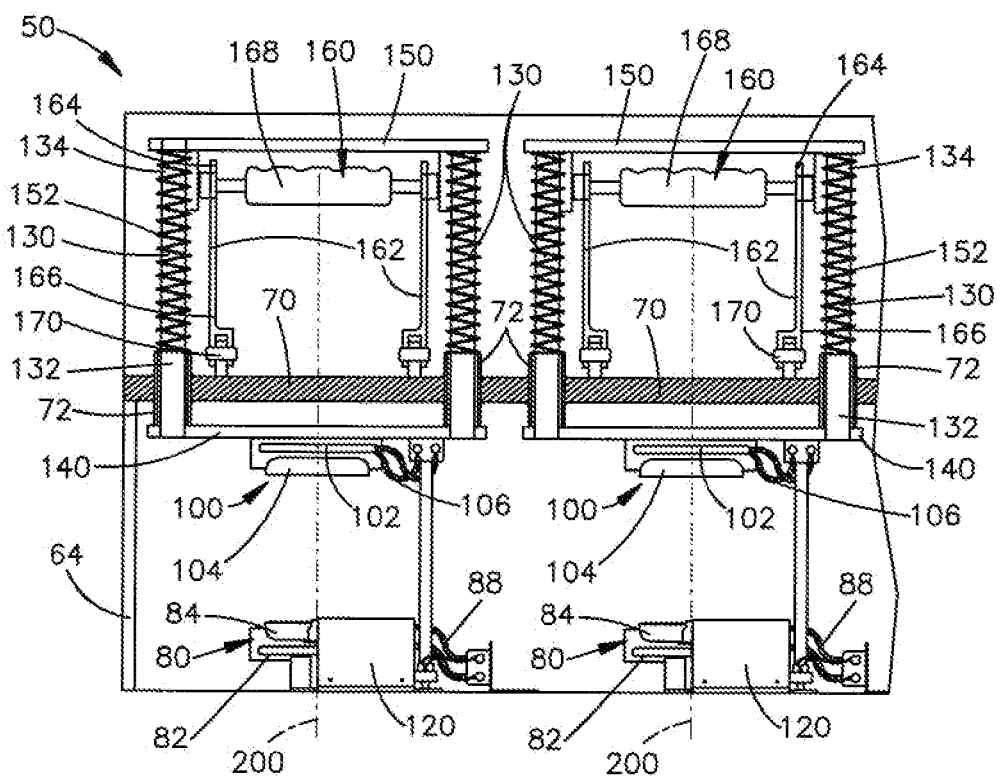
FIG. 6 is a sectional view taken along 6-6 of FIG. 3.

A plurality of guide members 72 are secured to or formed integrally with the frame 70 and extend in a direction that is substantially perpendicular to the frame. The guide members 72 include hollow tubes that have any desirable shape, such as circular, square, triangular or the like. A plurality of support members 130, 140, 150 are slidably connected to the frame 70 and control movement of the second heating unit 100 relative to the frame and the first heating unit 80. In particular, one or more first support members 130 having first and second ends 132, 134 extend vertically through the guide members 72. As shown in FIGS. 5-6, four first support members 130 are provided and extend vertically through four corresponding guide members 72 on the frame 70. The guide members 72 and first support members 130 may be positioned about the frame 70 in a rectangular pattern.

The number and position of the first support members 130 and guide members 72 may be dictated by the shape of the frame 70. For example, a frame 70 having a triangular shape may be provided with a guide member 72 along each side of the triangular shape and, thus, three corresponding first support members 130 may extend through the three guide members. In other words, a frame 70 having a particular shape may be provided with guide members 72 collectively arranged in that shape and a corresponding number of first support members 130. In any case, the first support members 130 may have any shape so long as the shape of each first support member corresponds with the shape of each guide member 72. The first support members 130 are sized to be slidable within and relative to the guide members 72.

The first ends 132 of the first support members 130 are secured to a second support member 140 positioned beneath the guide members 72 and secured to the second heating unit 100. The second ends 134 of the first support members 130 are secured to a third support member 150 positioned above the guide members 72. The second and third support members 140, 150 are configured to prevent the first support members 130 from exiting the guide members 72. Due to this construction, the first support members 130, second support member 140, third support member 150, and second heating unit 100 are integral with one another and therefore move together. The first, second, and third support members 130, 140, 150 may be formed of a durable, lightweight material.

An actuator 160 is provided for moving the support, members 130, 140, 150 relative to the frame 70 and the base 60. The actuator 160 includes one or more linking members 162 pivotally and slidably connected to the support members 130, 140, 150 and extending through slots 68 in the cover 66. As shown in FIG. 5, a pair of linking members 162 is provided, although more, or fewer linking members may be provided in accordance with the present invention. Each linking member 162 includes a first end 164 and a second end 166. The first ends 164 are secured to a handle 168 that is suitable for grasping by the operator of the device 50 and positioned outside of the cover 66. The second ends 166 are pivotally mounted to the frame 70 by an axle 170 secured thereto. Each linking member 162 further includes a slot 172 positioned between the first and second ends 164, 166. The slots 172 are pivotally and slidably mounted on the third support member 150 by an axle 174 secured thereto.

A biasing element 152, such as a compression spring, may be provided around one or more of the first support members 130 and between the guide members 72 and the third support member 150 to bias the third support member upward and away from the base 60. Since the third support member 150 is integral with the first and second support members 130, 140, and the actuator 160, the biasing elements 152 likewise bias the first and second support members, the actuator, and the second heating unit upward and away from the base 60. Alternatively or additionally, a torsion spring (not shown) may be positioned around the axle 170 and secured to the linking member(s) 162 and the second support member 140 to bias the actuator 160 and, thus, the second heating unit 100 upward and away from the base 60.

Figures 7A, 7B:
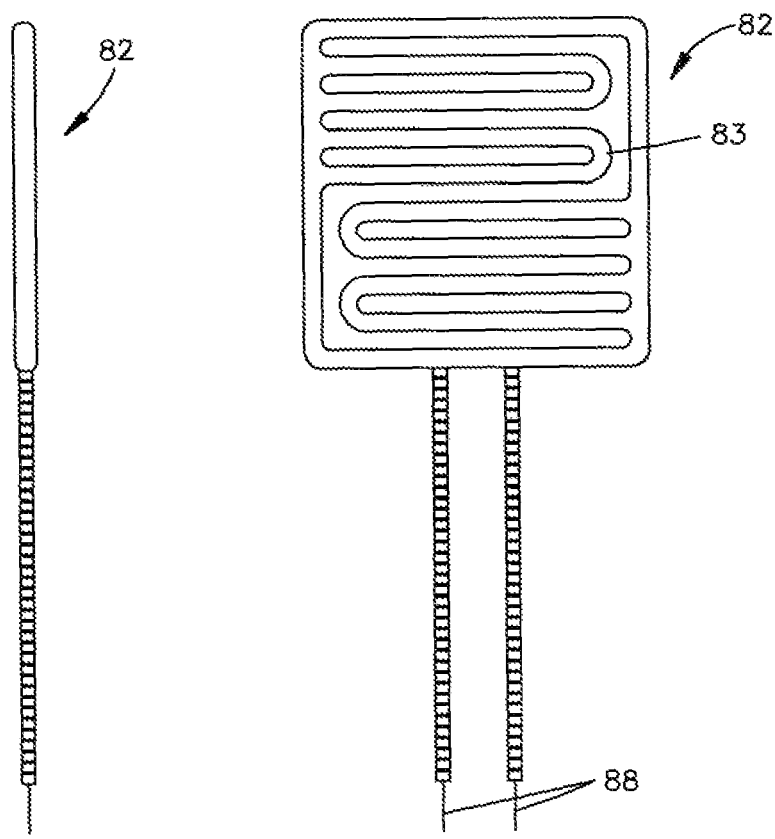
FIG. 7A is a side view of a heating element of the sandwich maker of FIG. 1.
FIG. 7B is a top view of the heating element of FIG. 7A.

The first heating unit 80 is positioned within the recess 62 of the base 60 and includes a heating element 82, a heated member 84, and a handle 86 connected to the heated member for manipulating the first heating unit. As shown in FIGS. 7A-7B, the heating element 82 includes a metal or polymer substrate on which a series of electrically conductive traces 83 are provided in a predetermined pattern. The traces 83 are made of a material that generates heat when electric current is applied. The heating element 82 may, for example, constitute a ceramic infrared heating element. The heating element 82 is integrally formed within or securely fixed to the recess 62 in the base 60.

As shown in FIGS. 8A-8C, the heated member 84 has a generally rectangular shape that is configured to accommodate bread or dough. In particular, the heated member 84 includes a wall 87 that defines an interior space 89 for receiving a piece of bread and foodstuffs, e.g., filling. A portion of the wall 87 defines an annular lip 90 having a recess 92. Alternatively or additionally, the annular lip 90 may include projections, serrations, roughened surfaces or the like.

The heated member 84 is placed within the recess 62 of the base 60 and overlying the heating element 82. Alternatively, the heating element 82 is secured to any portion of the wall 87 of the heated member 84 outside of the interior space 89 via adhesive, fasteners, etc. In this configuration, the heating element 82 may have a flexible construction that allows the heating element to conform to any shaped wall 87 of the heated member 84. In any case, the heated member 84 is made of a material that has desirable heat transfer properties such that heat produced by the heating element 82 is readily transferred through the wall 87 of the heated member and into the interior space 89 in order to heat any contents therein, e.g., bread and filling. The heated member 84 may, for example, be formed from a metal, such as steel or aluminum.

The handle 86 is secured to or integrally formed with the heated member 84. The handle 86 may have an elongated shape or otherwise be configured for grasping by the operator of the device 50. For example, the handle 86 may have a U-shaped or T-shaped configuration.

The second heating unit 100 has a construction that is similar to the construction of the first heating unit 80. The second heating unit 100 includes a heating element 102 and a heated member 104 (FIG. 5). The second heating unit 100 is secured to the second support member 140 via fasteners of the like such that the heated member 104 of the second heating unit 100 is aligned with the heated member 84 of the first heating unit 80. In this position, the heated members 84, 104 of the first and second heating units 80, 100 extend substantially parallel to one another.

The heating element 102 of the second heating unit 100 has a substantially similar construction to the heating element 82 of the first heating unit 80. The heating element 102 is formed integral with or secured to the second support member 140 and the heated member 104 is secured to the second support member overlying the heating element. Alternatively, the heating element 102 is secured directly to the wall 108 of the heated member 104 via adhesive, fastener, etc.

As shown in FIGS. 9A-9C, the heated member 104 has a generally rectangular shape for accommodating bread or dough. In particular, the heated member 104 includes a wall 108 that defines an interior space 110 for receiving a piece of bread or dough. A portion of the wall 108 defines an annular lip 112 having a recess 114. Alternatively or additionally, the annular lip 112 may include projections, serrations, roughened surfaces or the like. In any case, the lip 112 of the heated member 104 of the second heating unit 100 is configured to mate with the lip 90 of the heated member 84 of the first heating unit 80. The heated member 104 is made of a material that has desirable heat transfer properties such that heat produced by the heating element is readily transferred through the wall 108 of the heated member 104 and into the interior space 110 in order to heat any contents therein. The heated member 104 may, for example, be formed from a metal, such as steel or aluminum.

Figure 4:
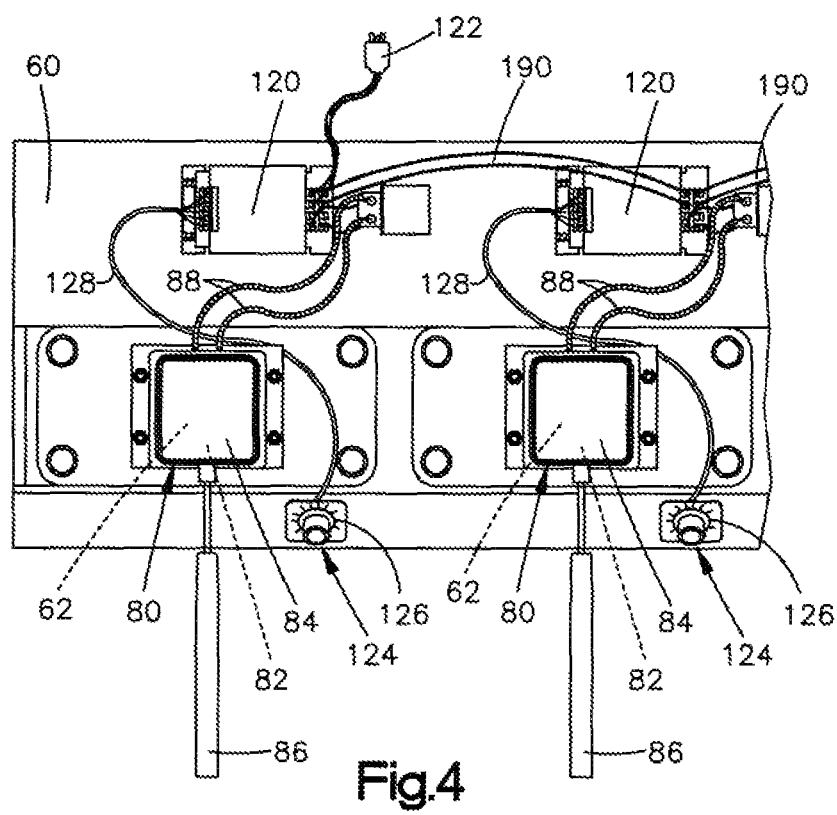
FIG. 4 is a sectional view taken along line 4-4 of FIG. 2.

A plurality of leads 88 electrically connect the traces 83 of the heating element 82 of the first heating unit 80 to a controller 120 secured to the base 60 (FIGS. 4 and 6). A plurality of leads 106 also electrically connects conductive traces 103 of the heating element 102 of the second heating unit 100 to the controller 120. The controller 120 is connected to a power cord 122 for providing power to the food preparation device 50. The controller 120 may vary the electrical output to the heating elements 82, 102 of the first and second heating units 80, 100 in order to vary the temperature of the heating elements to thereby vary the heat transferred to the interior spaces 89, 110 of the heated members 84, 104.

A dial indicator 124 bearing temperature indicia 126 is positioned on the base 60 and is connected to the controller 120 via leads 128 (FIG. 5). The temperature indicia 126 correlate with an amount of electric current needed to heat the heated members 82, 102 to the indicated temperature. An adjustment of the dial indicator 124 to particular temperature indicia 126 is communicated to the controller 120 via the leads 128. Based on the temperature indicia 126, the controller 120 supplies the appropriate amount of current to the heating elements 82, 102 of the first and second heating units 80, 100 via the leads 88 and 106, respectively. Therefore, the temperature of the first and second heating units 80, 100 may be continuously varied by adjusting the dial indicator 124.

Where the device 50 is provided with more than one pair of first and second heating units 80, 100, the pairs of heating units are electrically connected to one another via leads 190 (FIG. 4). Each pair of heating units 80, 100 may include its own controller 120 and dial indicator 124 such that each pair of heating units may have the same or different temperature. Each pair of heating units 80, 100 may be electrically isolated from one another such that malfunction of a single pair of heating units does not cause shutdown of the entire device 50, i.e., the remaining, functioning pairs of heating units may continue operation.

The controller 120 may be connected to a visual or audio alarm (not shown) for indicating that either or both of the heating units 80, 100 are not functioning properly. A temperature and/or current sensor (not shown) may monitor the actual temperature of the heated members 84, 104 and the current supplied by the controller 120 to ensure that the temperature-current correlation is maintained within a predetermined threshold. The controller 120 may be programmed to cease the supply of electricity to the first and second heating units 80, 100 if malfunction is detected, i.e., the temperature-current correlation falls outside the predetermined threshold.

When it is desirable to clean or service the first heating unit 80 for repairs, etc. the heated member 84 may be easily removed from the base 60 by manipulating the handle 86 secured to the heated member 82 in order to extract the heated member from the recess 62 in the base (FIG. 4). If desirable, releasable fasteners may be used to releasably secure first heating unit 80 within the recess 62 in the base 60. When the heating member 84 is removed from the recess 62 the heating element 82 remains within the recess and may be exposed to facilitate cleaning, etc. The heated member 104 of the second heating unit 100 may be releasably secured to the second support member 140 in order to remove the heated member 104 from the second support member for service, cleaning, etc. (FIG. 5).

Figure 3:
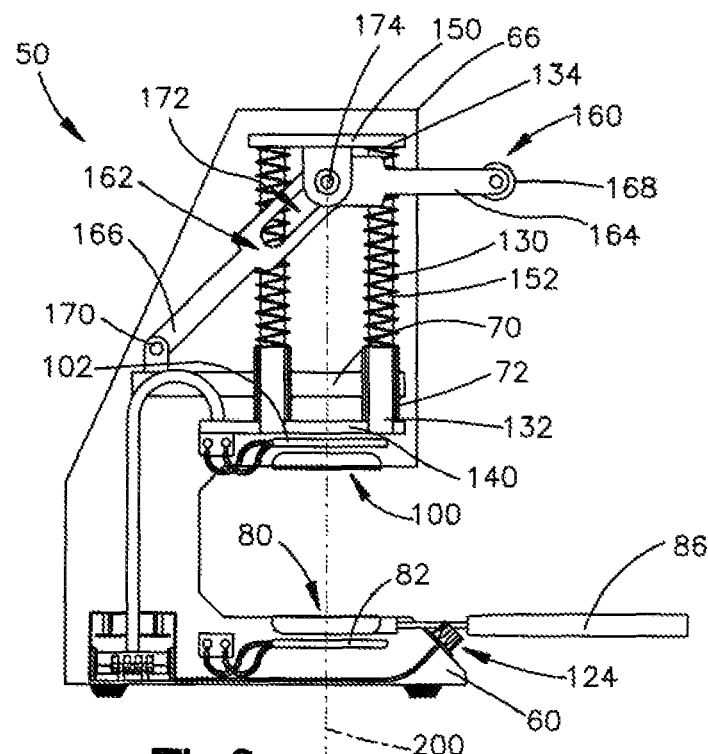
FIG. 3 is a sectional view of the sandwich maker of FIG. 1.
Figure 10:
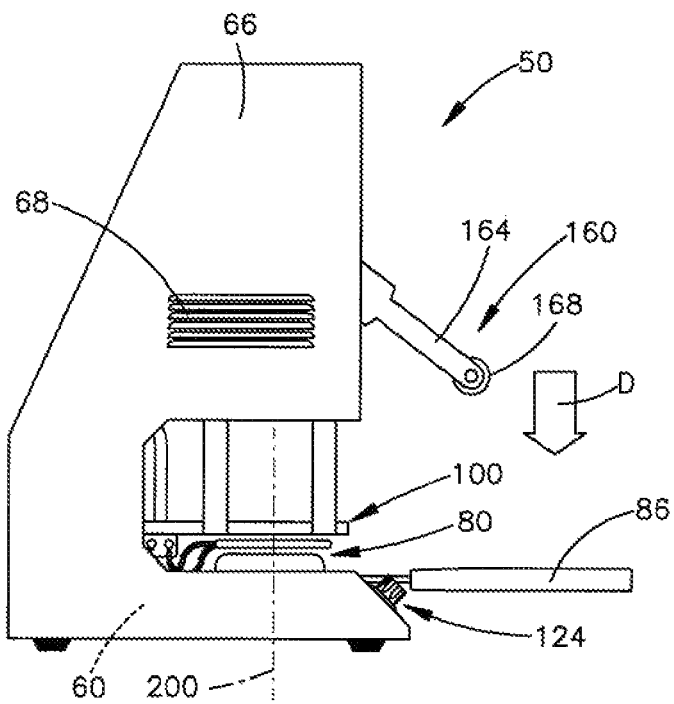
FIG. 10 is a side view of the sandwich maker of FIG. 1 in a second condition.
Figure 11:
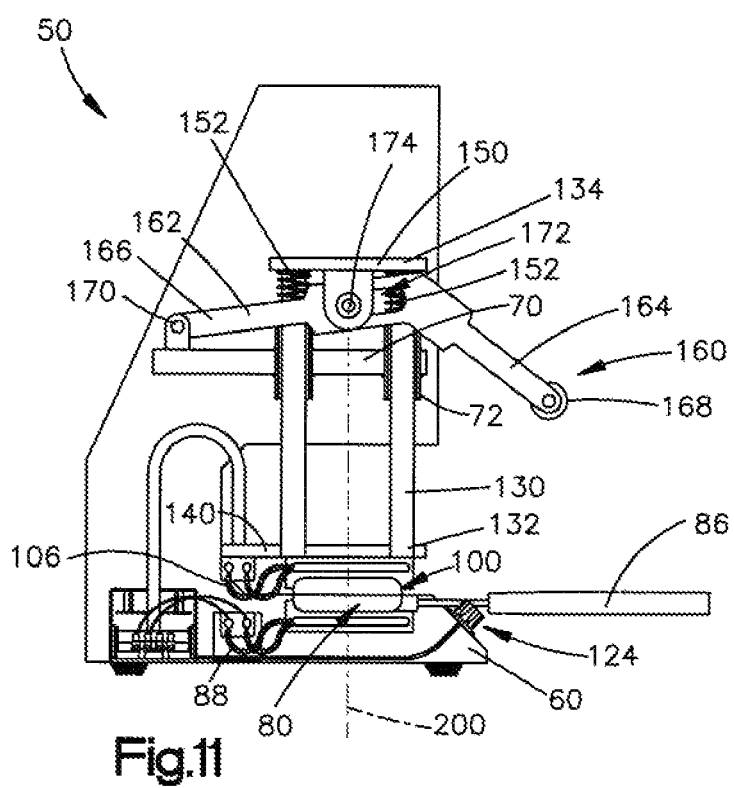
FIG. 11 is a section view of the sandwich maker of FIG. 10.

As shown in FIGS. 3 and 5-6, the actuator 160 secured to the third support member 150 via the axle 166 cooperates with the support members 130, 140, 150 to move the second heating unit 100 relative to the first heating unit 80. As noted, the first support members 130 are slidably positioned in the guide members 72 secured to the frame 70. Since the second support member 140, third support member 150, and second heating unit 100 are secured to the first support members 130, manipulation of the handle 168 of the actuator 160 secured to the third support member causes the handle and, thus, the support members and second heating unit secured thereto to move relative to the frame. More specifically, when the handle 168 outside the cover 66 is grasped by the operator and pulled downward towards the base 60 in the direction indicated by arrow D the handle imparts a downward force to the axle 166 secured to the third support member 150 (FIGS. 9-10).

Due to the integral connection between the third support member 150 and the first support members 130, second support member 140, and second heating unit 100, the downward force is likewise imparted to the first support members, second support member, and second heating unit. When the downward force is sufficient to overcome the upward bias of the biasing elements 152 the support members 130, 140, 150 begin to move downward and towards the base 60. Since the first support members 130 are positioned within the guide members 72 on the frame 70, the downward force applied by the handle 168 causes the support members 130, 140, 150 to move in a guided manner straight downward along an axis 200 and towards the base 60 as the first support members slide through the guide members. In other words, the support members 130, 140, 150 are confined to downward movement in a single direction, i.e., there is no lateral movement, tilting, etc., of the support members. Therefore, the second heating unit 100 secured to the support members 130, 140, 150 is likewise confined to downward movement in a single direction along the axis 200.

The downward movement of the support members 130, 140, 150 is further aided and guided by the connection between the support members and the frame 70. More specifically, downward movement is aided by the axle 174 slidably disposed within the slots 172 of the linking members 162 and the second ends 166 of the linking members pivotally secured to the frame 70 (see also FIG. 3). Downward movement of the axle 174 under the influence of the handle 168 causes the linking members 162 to rotate about the axle 170 in the clockwise direction as the axle 174 slides within the slots 172 away from the first ends 164 of the linking members towards the second ends 166. The sliding connection between the axle 174 and the slots 172 in the linking members 162, coupled with the sliding connection between the first support members 130 and the guide members 72 on the frame 70, ensure that the support members 130, 140, 150 and, thus, the second heating unit 100 secured thereto move downward along the straight, linear path of the axis 200 relative to the frame.

Movement of the second heating unit 100 in a downward direction causes the first and second heating units 80, 100 to move closer to one another. Due to the guided movement of the support members 130, 140, 150 and the second heating unit 100 along the axis 200, the heated member 104 of the second heating unit remains aligned with and parallel to the heated member 84 of the first heating unit 80 as the second heating unit moves downward and closer to the first heating unit. The handle 168 may be pulled downward in the direction D until the heated member 104 of the second heating unit 100 mates with the heated member 84 of the first heating unit 80. More specifically, the lip 112 and recess 114 on the heated member 104 of the second heating unit 100 mate with the recess 92 and lip 90, respectively, on the heated member 84 of the first heating unit 80.

In use, the dial indicator 124 is first turned to the desired temperature indicia 132 to direct the appropriate amount of current from the power cord 122 to the heating elements 82, 102 via the leads 88, 106 and thereby heat the heated member of the first heating unit 80. Bread or dough is placed in the heated member 84 of the first heating unit 80. The bread is sized such that the periphery or crust extends over the recess 92 of the heated member 84. A filling, such as pie filling, is placed over the interior of the bread in the heated member 84. A second piece of bread is placed over the filling and aligned with the first piece of bread to form a sandwich. Since the heated member 84 of the first heating unit 80 is already heated, the sandwich begins heating as soon as the bread and filling are placed in the heated member of the first heating unit, thereby reducing preparation time The handle 168 is then pulled in the direction D against the bias of the biasing elements 152 to move the second heating unit 100 downward along the axis 200 until the recesses 92, 114 of the heated members 82, 102 of the first and second heating units 80, 100 approach one another. This causes the top slice of bread to enter the interior space 110 of the heated member 104 of second heating unit 100. The lips 90, 112 and associated recesses 92, 114 (and/or associated projections, serrations, roughened surfaces, etc.) of the first and second heating units 80, 100, respectively, cooperate to crimp the peripheries of the bread pieces together in a sealing manner to prevent the filling between the bread pieces from leaking out. The crimping may also remove the crust from both pieces of bread. The recesses 92, 114 and lips 90, 112 of the heated members 82, 102 may be configured to adequately crimp the bread pieces with or without directly engaging one another. In any case, due to the parallel arrangement of the first and second heating units 80, 100 during the entire operation of the device 50, the second heating unit may move into proximity with the first heating unit sufficient to crimp the bread pieces therebetween while preventing the bread pieces from moving relative to one another and thereby ensures a quality seal between the bread pieces.

One of the heated members 84 or 104 may be provided with a cutting member (not shown) that extends from the outer surface of the wall 87 or 108 of the heated member adjacent to the lip 90 or 112. The heated members 84, 104 may thereby cooperate with one another to cut portions of the sandwich, e.g., to remove extra dough or bread crust positioned radially outward from the crimped area.

Furthermore, since current is supplied to the first and second heating units 80, 100 to heat the first and second heating units both before the sandwich ingredients are introduced and during the crimping process, the contents of the first and second heating units are heated to cook the sandwich during crimping in a timely manner. Adjusting the dial indicator 124 allows the controller 120 to vary the temperature of the first and second heating units 80, 100 in order to cook or re-heat sandwiches made of different ingredients.

The handle 168 may be held in the downward position for a predetermined time in order to adequately cook the sandwich. Alternatively, portions of the device 50, such as the base 60 and the second support member 140, may be provided with releasable cooperating structure (not shown), e.g., clamping elements, hooks, magnets, etc., for maintaining the second heating unit 100 in proximity with the first heating unit 80 without requiring that the operator physically maintain a downward force on the handle 168 during heating of the sandwich. The cooperating structure may be engaged while heating the sandwich and released when heating is complete.

Once the sandwich is sufficiently heated and sealed, the handle 168 is moved upwards in a direction opposite the direction D to move the second heating unit 100 away from the first heating unit 80. The bias of the biasing elements 152 helps to urge the second heating unit and handle 160 upward and away from the first heating unit 80. The sealed sandwich remains in the first heating unit 80 such that it can be removed from the first heating unit when the second heating unit 100 is sufficiently spaced from the first heating unit. The device 50 is then ready to prepare another sealed sandwich. Between sandwich making operations, the handle 168 may be held in the downward position (FIG. 9) such that the first and second heating units 80, 100 are held together to keep heat within the closed interior spaces 89, 110 of the heated members 82, 104, thereby keeping the heated members hot between sandwich making operations.

As noted, the device 50 of the present invention may include more than one pair of corresponding first and second heating units 80, 100 connected by leads 190 and positioned on the base 60 and frame 70, respectively. Therefore, the device 50 of the present invention allows multiple sandwiches having the same or different ingredients to be made at a time. As shown in FIG. 4, each corresponding pair of first and second heating units 80, 100 may have a handle 168 such that each pair of first and second heating units may be operated independently from one another. Alternatively, a single handle (not shown) may be connected to multiple pairs of first and second heating units 80, 100, e.g., a single handle may be connected to the linking members 162 associated with every second heating unit, such that downward movement in the direction D of the handle causes multiple second heating units to move along the axis 200 and similar axes extending parallel thereto, thereby allowing more than one sandwich to be made simultaneously by pulling downward on a single handle.

In an alternative use of the present invention, the heating elements 82, 102 of the first and second heating units 80, 100 may be omitted (not shown) or turned off during operation of the device 50. The device 50 may otherwise be used in the manner described to crimp and seal pieces of bread or dough together to form sealed sandwiches. In such a construction, however, the heated members 84, 104 are not heated and, thus, the sandwiches are made cold or at room temperature, e.g., peanut butter and jelly sandwich or ice cream sandwich. Since the unheated members 84, 104 are still provided with cooperating lips 90, 112 and recesses 92, 114 the cold sandwich is still crimped and sealed by the device despite the absence of heat. Moreover, if the cutting member is provided on one of the unheated members 84, 104, the periphery of the cold sandwich is also cleanly severed around the crimped edges. Accordingly, when the device 50 includes more than one pair of heating units 80, 100, each pair of heating units may be selectively turned on or off or the heating elements 82, 102 omitted such that either hot or cold crimped, sealed sandwiches can be made at the same time in accordance with the present invention.

The preferred embodiments of the invention have been illustrated and described in detail. However, the present invention is not to be considered limited to the precise con- Having described the invention, the following is claimed:

1. A food preparation device for crimping and sealing pieces of bread together comprising:
   a base;
   at least one first heating unit positioned on the base and including a heating element connected to the base and a member heated by the heating element, wherein a handle is secured to the heated member for removing the heated member from the base while the heating element remains connected to the base; and
   at least one second heating unit spaced from the base and extending parallel to the first heating unit, the second heating unit being movable from a first position spaced a first distance from the first heating unit to a second position spaced a second, shorter distance from the first heating unit for crimping and sealing bread pieces together between the first and second heating units, the first and second heating units remaining parallel with one another while the second heating unit moves from the first position to the second position.

2. The food preparation device of claim 1, wherein the second heating unit moves along a vertical path from the first position to the second position.

3. The food preparation device of claim 1 further comprising a frame connected to the base, the second heating unit being secured to the frame.

4. The food preparation device of claim 3 further comprising a plurality of support members connected to and movable relative to the frame for moving the second heating unit between the first and second positions.

5. The food preparation device of claim 4, wherein the frame includes at least one guide member for guiding movement of the support members relative to the frame.

6. The food preparation device of claim 4 further comprising an actuator pivotally and slidably connected to the support members for placing the second heating unit in the first and second positions.

7. The food preparation device of claim 1 further comprising a biasing member for biasing the second heating unit into the first position.

8. The food preparation device of claim 1 further comprising a controller and a dial indicator electrically connected to first and second heating units for controlling the temperature of the first and second heating units.

9. The food preparation device of claim 1, wherein the heated member of the first heating unit includes a wall defining an interior space for receiving a piece of bread and the second heating unit includes a heated member having a wall defining an interior space for receiving a piece of bread, each of the walls of the heated members including annular structure for crimping and sealing the bread pieces together.

10. A food preparation device for crimping and sealing pieces of bread together comprising:
    a base;
    at least one first heating unit positioned on the base and including a heating element and a member heated by the heating element, wherein a handle is secured to the heated member for removing the heated member from the base; and
    at least one second heating unit spaced from the base and extending parallel to the first heating unit, the second heating unit being positioned on a frame extending from the base and comprising a heating element and a member heated by the heating element, the heated member of the second heating unit being removable from the frame without removing the heating element of the second heating unit from the frame;
    the second heating unit being movable from a first position spaced a first distance from the first heating unit to a second position spaced a second, shorter distance from the first heating unit for crimping and sealing bread pieces together between the first and second heating units, the first and second heating units remaining parallel with one another while the second heating unit moves from the first position to the second position.

11. The food preparation device of claim 10, wherein the heated member of each first and second heating unit includes cooperating structure for crimping the bread pieces together.

12. A food preparation device for crimping and sealing pieces of bread together comprising:
    a base;
    a plurality of first heating units positioned on the base with each including a heating element connected to the base and a member heated by the heating element, wherein a handle is secured to the heated member of each first heating unit for removing the heated member from the base while the heating element remains connected to the base; and
    a plurality of second heating units spaced from the base and extending parallel to the first heating units, each of the second heating units being independently movable relative to one another and being paired with a corresponding first heating unit, each second heating unit being movable from a first position spaced a first distance from each corresponding first heating unit to a second position spaced a second, shorter distance from each corresponding first heating unit for crimping and sealing bread pieces together between the first and second heating units, the first and second heating units remaining parallel with one another while the second heating units move from the first position to the second position.

13. The food preparation device of claim 12 further comprising a controller and dial indicators electrically connected to each pair of first and second heating units for independently controlling the temperature of each pair of first and second heating units.

14. The food preparation device of claim 12, wherein each of the plurality of second heating units moves along a vertical path from the first position to the second position.

15. The food preparation device of claim 12, wherein each of the plurality of second heating units includes a heating element and a member heated by the heating element, each of the heated members of the pairs of first and second heating units including cooperating structure for crimping the bread pieces together.

* * * * *